No. 763,482. PATENTED JUNE 28, 1904.
A. GRAY.
PROCESS OF DRYING TIMBER.
APPLICATION FILED FEB. 9, 1904.
NO MODEL.
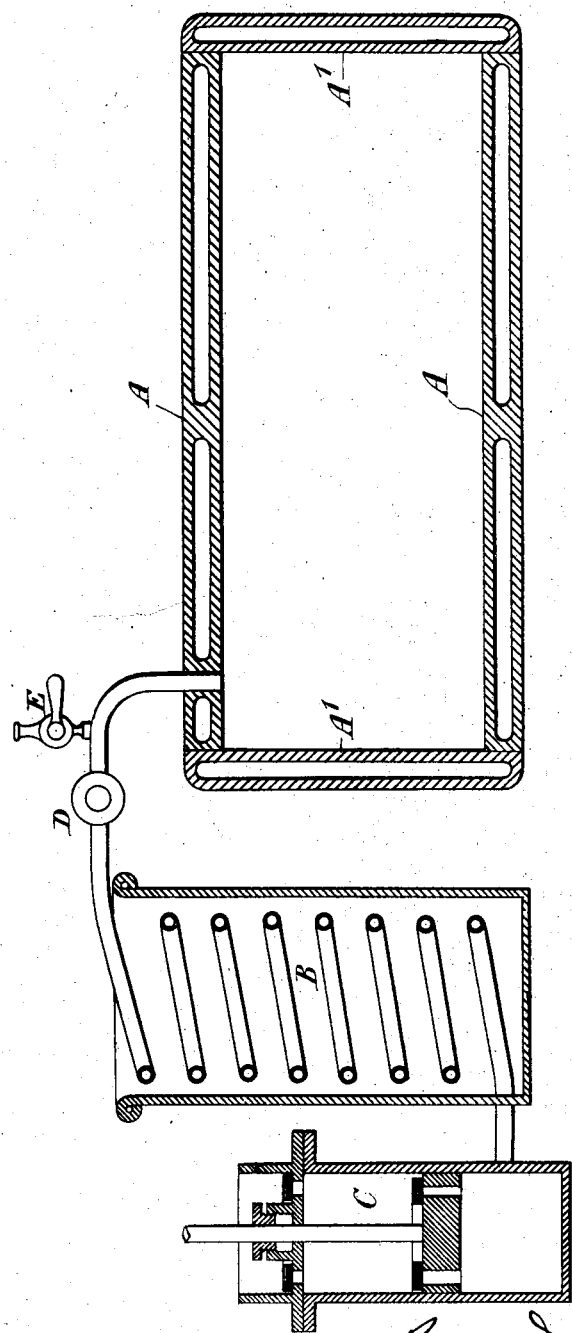
Witnesses.
M. L. Adams
E. B. Bruner
Inventor.
Alexander Gray
By his Attys.
Baldwin Davidson Wight.

No. 763,482. Patented June 28, 1904.

UNITED STATES PATENT OFFICE.

ALEXANDER GRAY, OF SUTTON, ENGLAND.

PROCESS OF DRYING TIMBER.

SPECIFICATION forming part of Letters Patent No. 763,482, dated June 28, 1904.

Application filed February 9, 1904. Serial No. 192,832. (No model.)

*To all whom it may concern:*

Be it known that I, ALEXANDER GRAY, engineer, a subject of the King of Great Britain, residing at Sharrow, Holland Road, Sutton, in the county of Surrey, England, have invented a certain new and useful Improvement in Processes of Drying Timber, of which the following is a specification.

The drawing represents in a diagrammatic manner the apparatus I employ.

According to this invention the timber to be dried is placed into a vessel, which is then closed air-tight and is uniformly heated throughout to any desired temperature—say to about 140° Fahrenheit or higher. The heat may be applied to the exterior of the vessel and the heating may be maintained for some hours until the timber has been uniformly heated throughout to this temperature, or nearly so. The time taken in doing so will depend on the thickness of the timber. For timber about six inches square in cross-section I have found it desirable to continue the heating for about ten hours. When the timber has become uniformly heated throughout to the desired temperature, air and vapor are quickly removed from the interior of the closed vessel by an air-pump until a more or less perfect vacuum is obtained, and the vacuum is maintained, say, for about half an hour. If desired, a condenser may be used for condensing the vapors so drawn off. Under the influence of the vacuum the moisture commences to evaporate and the evaporation extends throughout the mass of the timber, the evaporation taking place no doubt superficially in the first place; but as the outer part of the timber is cooled by the evaporation of the contained moisture, the vapor tension of the moisture in the inner part being greater than that of the moisture nearer the surface, the moisture of the inner part evaporates more readily than that of the outer part, and as this process extends throughout the whole thickness of the timber the timber is for all practical purposes dried to an equal degree throughout. The timber having thus been partially dried and cooled down throughout its substance by the evaporation of moisture has now to be again heated throughout its mass, and when so heated is again subjected to the action of a more or less perfect vacuum, and these successive operations are repeated until the wood has been dried to the extent required.

If desired, the temperature to which the timber is heated in the later stages may be gradually raised.

It has been found advantageous to commence with a temperature of about 140° Fahrenheit and gradually to raise the temperature to 180° in the later stages. When this is done, it has been found that five repetitions of the exhausting process have proved sufficient to dry timber six inches square, allowing ten hours for uniform heating to take place between each application of the vacuum.

It is desirable to allow the vessel containing the timber to fill with air at normal atmospheric pressure or it might be with other gas or vapor to avoid evaporation of moisture from the outside of the timber when it next commences to be heated in order not only to avoid cracking or warping the timber, but also to provide a medium for the conduction of heat from the walls of the chamber to the wood within it. It may, however, not be essential to admit air or other gas or vapor, as the moisture in the outer layers of the wood might be enough as the heat rose to fill the chamber with vapor without materially injuring the wood; but it is essential that the vessel should be cut off from the action of the air-pump and condensing apparatus.

The amount of evaporation from the wood at each application of the vacuum can be regulated partly by the temperature to which the wood is heated and partly by the degree of vacuum to which the wood is subjected.

The amount of moisture evaporated at any one stage will depend on these two factors and also upon the specific heat of the particular timber being dried.

A is a drying-chamber and A' doors by which its ends are closed.

B is a condensing-coil; C, an air-pump; D, a cut-off valve for closing connection between the drying-chamber and the condenser, and E an air-cock for admitting air to the drying-chamber when commencing to heat the timber.

When the chamber has been filled with air, the cock is to be at once closed. The walls and end doors of the chamber are, as shown, made hollow to allow of their being heated by admitting more or less steam to their hollow interior. The end doors have to be heated as well as the walls; otherwise when the chamber is closed and the timber is being heated there would be condensation of moisture on the cooler walls, and evaporation of moisture from the timber would go on continuously while the timber was being heated, whereas to obtain the best results it is desirable that the amount of moisture evaporated off from the timber while it is being heated should be as little as practicable.

What I claim is—

1. The hereinbefore-described process of drying timber, consisting in first inclosing the timber in an air-tight vessel then heating the timber uniformly throughout its thickness and afterward withdrawing air and vapor from the vessel and for a time maintaining more or less of a vacuum within it afterward ceasing to withdraw air and vapor and again heating the timber uniformly throughout its thickness and so on, repeating the operations until the timber has been dried to the required extent.

2. The hereinbefore-described process of drying timber, consisting in first inclosing the timber in an air-tight vessel then heating the timber uniformly throughout its thickness and afterward withdrawing air and vapor from the vessel and for a time maintaining more or less of a vacuum within it afterward ceasing to withdraw air and vapor and destroying the vacuum then again closing the vessel and again heating the timber uniformly throughout its thickness and so on repeating the operations until the timber has been dried to the required extent.

3. The hereinbefore-described process of drying timber, consisting in first inclosing the timber in an air-tight vessel then heating the timber uniformly throughout its thickness and afterward withdrawing air and vapor from the vessel and for a time maintaining more or less of a vacuum within it afterward ceasing to withdraw air and vapor and again heating the timber uniformly throughout its thickness and so on, and gradually increasing the temperature to which the timber is heated in the successive operations.

ALEXANDER GRAY.

Witnesses:
    H. D. JAMESON,
    A. NUTTING.